UNITED STATES PATENT OFFICE.

SAMUEL T. CHASE, OF BROOKLYN, NEW YORK.

IMPROVEMENT IN PROCESSES OF DESICCATING COCOA-NUT.

Specification forming part of Letters Patent No. 202,521, dated April 16, 1878; application filed January 23, 1878.

*To all whom it may concern:*

Be it known that I, SAMUEL T. CHASE, of Brooklyn, in the county of Kings and State of New York, have invented a new and Improved Process of Treating Cocoa-Nut, of which the following is a specification:

My invention consists of an improved process of preparing and preserving grated cocoa-nut for the market. The process of preparing cocoa-nut to which mine is most nearly related is that in which the grated meat of the cocoa-nut is desiccated by heat and combined with sugar. The difficulty, however, has been in securing the thorough incorporation of the sugar with the solid fiber of the meat, and its perfect union with the stearine and oil, the ordinary process referred to serving only to dry the exterior of the kernels and coat the outside with the sugar, while leaving in the center of the kernels a portion of the natural juices of the nut unchanged, which remains in a condition susceptible of fermentation and rancidity.

My improvement consists, chiefly, in treating the grated kernels with sugar in a vacuum and at a high temperature, whereby the following results are attained: The vacuum both abstracts the oxygen from around the mass of cocoa-nut and permits that temperature to be employed which is necessary to the perfect union of the sugar with the oil and stearine of the nut, without danger of oxidation and formation of red spots, which would occur but for the abstraction of the oxygen by mechanical means, and at the same time said vacuum brings to the surface of each kernel the juices contained in the center, thus intimately mixing the sugar with the oil and stearine, so that they can be thoroughly mixed and incorporated in the solid kernel, which assumes a clear transparent appearance of homogeneous character through and through.

In carrying out my invention I take the cocoa-nut meat from the shell, and peel it and grate it. Then, to every fifty pounds of the grated cocoa-nut I add, preferably, one pound of refined borax, and thoroughly mix the borax and the cocoa-nut, and allow it to rest in a conical pile for about thirty minutes, to allow the cocoanut to become saturated with the borax, which will be dissolved by the moisture of the nut. I place the cocoa-nut thus prepared in pans made of unoxidable material, and spread it so that it covers the bottom of the pan to the depth of about three inches. I place the pans containing the cocoa-nut in a vacuum-chamber, and for thirty minutes subject the cocoa-nut to a temperature of 212° Fahrenheit *in vacuo*.

The addition of the borax and the preliminary heating to incorporate it do not constitute an essential feature of the process, and may be dispensed with; but its antiseptic properties may be made use of to advantage when the product is to be subjected to extreme tests of preservation in very hot climates.

I then remove the cocoa-nut from the vacuum-chamber, and to every fifty pounds I add twenty-five pounds (more or less) of granulated sugar, which is thoroughly mixed with the cocoa-nut, when the latter is returned to the vacuum-chamber, and subjected, *in vacuo*, to a temperature of about 300° Fahrenheit for one hour. This constitutes the most effective part of the treatment, and during the same the vacuum operates with a double function—first, to bring the oil from the center of the particles to the surface, where its impregnation with the sugar is effected; and, secondly, by removing the oxygen of the air, allows the temperature to be raised (without danger of oxidizing) to that point which is necessary to combine the sugar with the oil and stearine. In excluding the oxygen from the product under treatment the vacuum prevents the formation of red or brown spots, which, in the presence of the air, make their appearance when the temperature is reached which secures the best combination of the sugar with the oil and stearine.

Both temperature and time may be varied to suit the quality of the nuts under treatment, nuts rich in oil requiring the greater heat.

The chambers in which the cocoa-nut is subjected to the heating process are provided with means for accurately regulating the temperature, and the pans containing the cocoa-nut are suspended, to insure an even temperature in all parts of the pan.

At this stage of the process the cocoa-nut becomes translucent, and the oil, stearine, and sugar are perfectly combined; but the surfaces of the particles are still wet with these combined materials. The cocoa-nut is now subjected to a desiccating process, which removes all of the remaining moisture, and renders it thoroughly antiseptic and proof against disintegration. Although the drying may be accomplished by any of the usual known processes, I prefer to use drying-chambers provided with ventilators covered with an absorbent covering, such as sponge or fibrous material, which will absorb the moisture without permitting the aroma of the nut to escape, the chamber being contrived so that the absorbers may be removed and deprived of their moisture whenever it becomes necessary.

By my process the cocoa-nut is made capable of assimilating sixty-five per cent. of sugar, and the product has a crystalline appearance, is perfectly homogeneous through and through, and will keep fresh and sweet for an indefinite length of time.

Having thus fully described my invention, I claim as new and desire to secure by Letters Patent—

The process of preparing cocoa-nut which consists in incorporating a proportion of sugar with the grated meat, and subjecting it to a temperature of about 300° Fahrenheit in a vacuum, and finally drying the product, substantially as described.

SAMUEL T. CHASE.

Witnesses:
GEO. M. HOPKINS,
C. SEDGWICK.